United States Patent

Opacic et al.

[11] 3,893,656
[45] July 8, 1975

[54] MOBILE UNIT FOR TREATING LIQUID WASTE

[75] Inventors: Donald J. Opacic; Arpad L. Lengyel, both of Pittsburgh; Edward A. Zawadzki, McMurray; Fred H. Jackson, Bridgeville, all of Pa.

[73] Assignee: Chemfix Inc., Pittsburgh, Pa.

[22] Filed: Aug. 20, 1973

[21] Appl. No.: 389,565

[52] U.S. Cl. .......... 259/7; 61/63; 210/199; 210/241; 259/151; 302/53
[51] Int. Cl.² .......... B01F 5/00; B01F 7/16
[58] Field of Search .......... 210/10, 42, 46, 47, 52, 210/67, 152, 170, 199, 241; 302/42, 53, 54; 61/35, 63; 259/147, 151, 7

[56] References Cited
UNITED STATES PATENTS

| | | | |
|---|---|---|---|
| 2,827,333 | 3/1958 | Wallin | 302/42 X |
| 2,907,605 | 10/1959 | Brooks | 302/42 X |
| 2,924,489 | 2/1960 | Beckmann | 302/53 |
| 2,975,000 | 3/1961 | Davis, Jr. | 302/53 X |
| 3,179,378 | 4/1965 | Zenz et al. | 259/151 X |
| 3,226,319 | 12/1965 | Schick | 210/10 X |
| 3,260,389 | 7/1966 | Paton | 302/53 X |
| 3,404,088 | 10/1968 | Dujardin | 210/199 X |
| 3,434,598 | 3/1969 | Daman | 210/199 |
| 3,446,742 | 5/1969 | Bacon | 210/42 X |
| 3,620,575 | 11/1971 | McIver | 302/53 |
| 3,841,102 | 10/1974 | Cinner et al. | 61/35 |

*Primary Examiner*—Samih N. Zaharna
*Assistant Examiner*—Robert H. Spitzer
*Attorney, Agent, or Firm*—Brown, Murray, Flick & Peckham

[57] ABSTRACT

A mobile unit for treating liquid waste to render it non-polluting and fit for ultimate disposal includes a mixing hopper having an inlet for receiving liquid waste, and an outlet for connection to a conduit extending to a disposal area. The unit also includes a bin for a powdered setting agent for a liquid alkali metal silicate. The bin has an outlet at its bottom and a porous floor spaced above its bottom. Compressed air is delivered to the space beneath the floor to form a fluidized bed of setting agent above the floor. The setting agent is delivered to the mixing hopper in which it is mixed with the liquid waste. After the mixture leaves the hopper, liquid alkali metal silicate from a tank in the mobile unit is delivered to the mixture. The treated waste will set after it has reached the disposal area.

9 Claims, 13 Drawing Figures

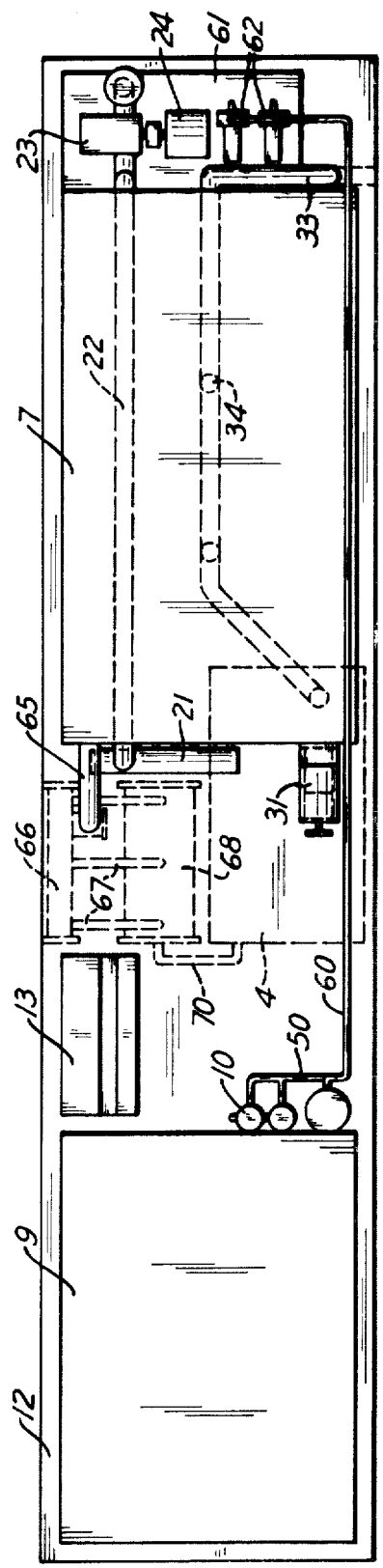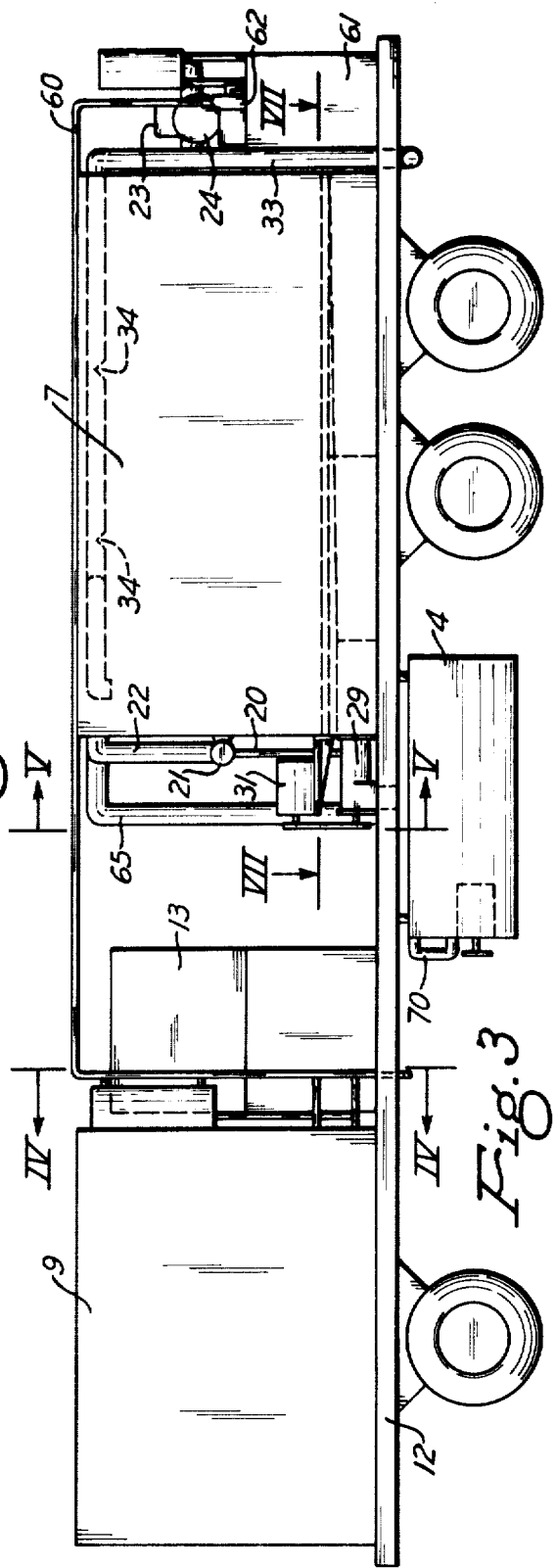

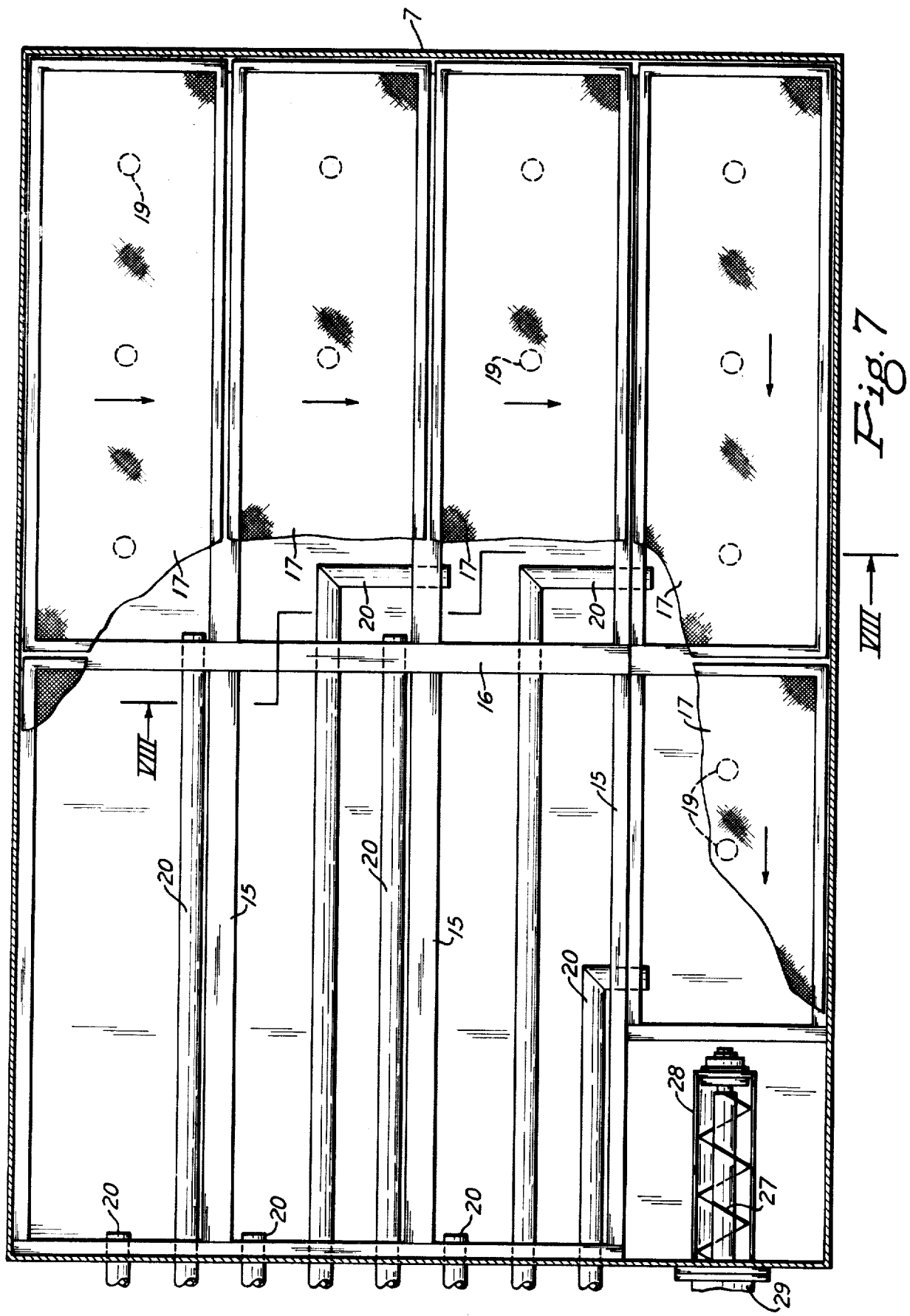

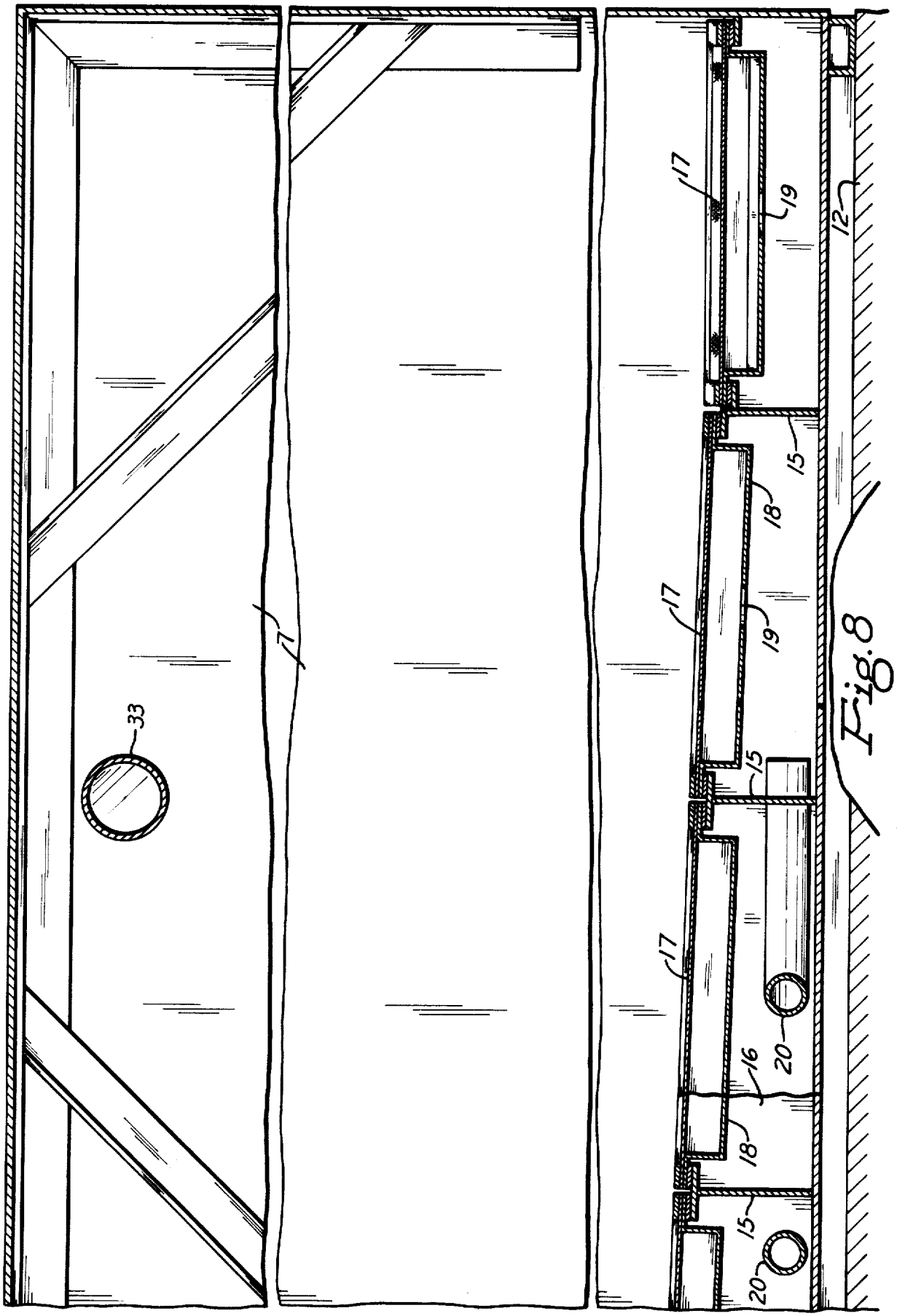

MOBILE UNIT FOR TREATING LIQUID WASTE

BACKGROUND OF THE INVENTION

The disposal of liquid waste by industrial plants is a big problem because the waste should be disposed of in such a manner that it does not pollute the environment, and yet at a cost that can be lived with. The dumping of waste into rivers and other bodies of water is now prevented to a large extent. Not being able to get rid of the waste in that manner, many industries build ponds or lagoons, to which they deliver the liquid waste. Such a system is not satisfactory because the waste sometimes breaks out of its confinement, due to dike failure and substrate seepage. Even if it stays in place, large areas of land are required in order to provide the holding ponds. One solution to the disposal problem that has proved highly successful is to remove the liquid waste or sludge from the ponds, mix it with an alkali metal silicate and a setting agent and then pump it out onto land of little value where the waste immediately or in a very short time solidifies into a dirt-like material in which the pollutants are trapped. This waste material meets environmental standards because it is non-polluting. It also can be used as land fill and therefore has utility. Since, in the case of large volumes, it would be very expensive to transport the liquid waste from the holding ponds to a central treatment plant and then carry the treated material to a disposal area, it is highly desirable to be able to transport the treatment equipment to the ponds.

It is therefore among the objects of this invention to provide a mobile unit for treating liquid waste, which is compact and transportable over highways, which is efficient in operation, and which renders the waste non-polluting and fit for ultimate disposal.

The preferred embodiment of the invention is illustrated in the accompanying drawings, in which FIG. 1 is a diagram of the waste treating system;

FIG. 2 is a plan view of the mobile unit;

FIG. 3 is a side view;

FIG. 7 is an enlarged horizontal section taken on the line VII—VII of FIG. 3;

FIG. 8 is a further enlarged fragmentary vertical section taken on the line VIII—VIII of FIG. 7;

Figure 1:
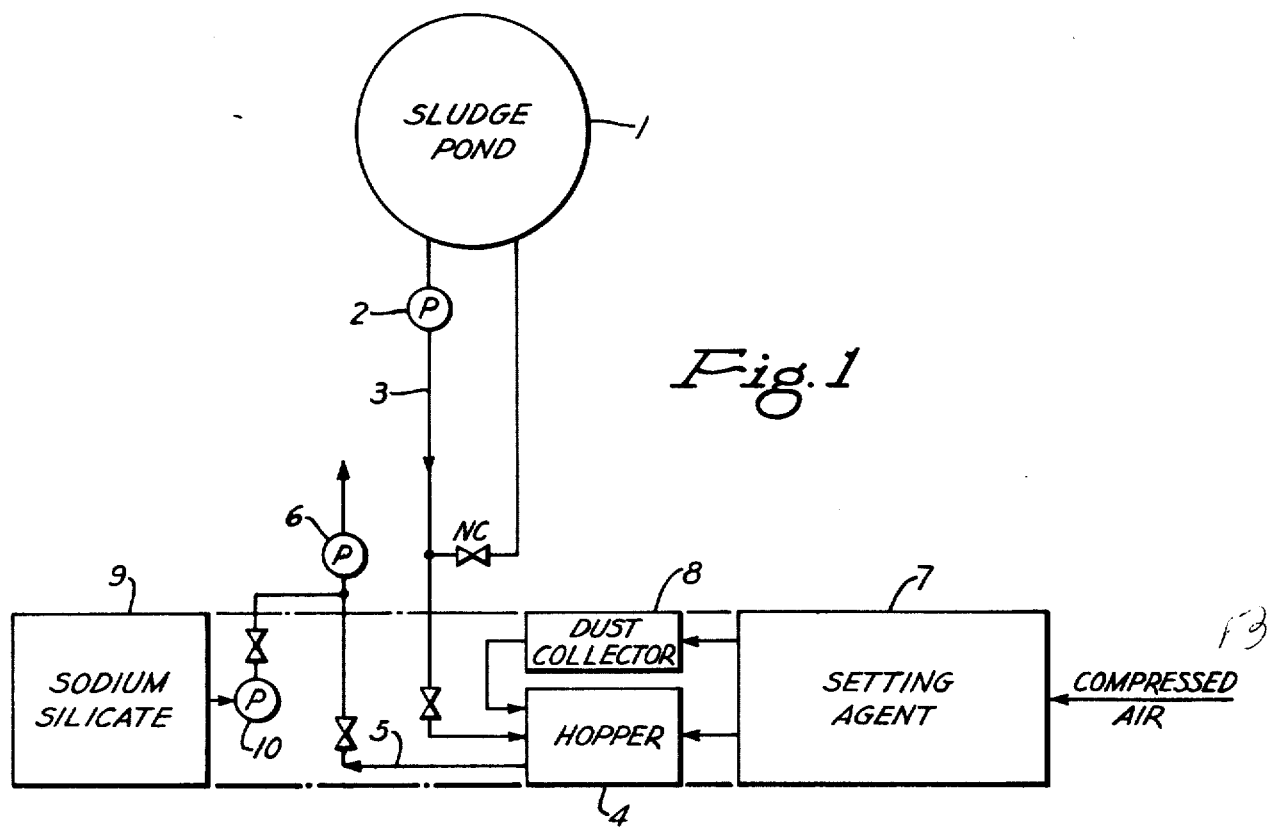

Referring to FIG. 1 of the drawings, a sludge pond 1 is indicated which contains liquid waste. A portable pump 2 is wheeled up close to the pond and its suction line placed in the pond. The outlet of the pump is connected by a hose 3 to the inlet of a mixing hopper 4. The outlet of this hopper is connected by a hose 5 to the inlet of a discharge pump 6 that delivers the material from the hopper to the desired place of deposit, such as a low place in the land that is to be filled in. While the liquid waste is in the hopper it is mixed with a powdered setting agent for an alkali metal silicate. The setting agent most suitably is Portland cement, because of its cheapness and availability. The cement is in a large bin 7, from which it is delivered to the hopper to mix with the liquid waste. Compressed air in the bin produces a fluidized bed of the cement so that it can readily be delivered to the mixing hopper. Dust-laden air escaping from the top of the bin is conducted to a dust collector 8 and then delivered to the mixing hopper. After the mixture of waste and setting agent leave the hopper, but before it reaches the discharge pump 6, an aqueous solution of an alkali metal silicate, such as sodium silicate, in a tank 9 is pumped into the mixture by means of a pump 10. The resulting complete mixture passes through the discharge pump and is pumped out onto the land, where the reaction of the setting agent with the sodium silicate and the waste material forms a chemically inert and water-insoluble dirt-like product.

In accordance with this invention, the bin for the setting agent, the sodium silicate tank, the mixing hopper and the dust collector are all mounted, along with other components of the system, on the chassis 12 or bed of a trailer that can be hauled over the highways and across open fields to locations close to waste collection ponds or the like. Preferably, the trailer is completely enclosed so that it is a large van, but the enclosing walls and roof are omitted from the drawings for the sake of clearness. As shown in FIGS. 2 and 3, the bin 7 for the setting agent preferably is mounted on the vehicle chassis over its back wheels, but spaced forward from its rear end. The tank 9 for the sodium silicate is mounted on the chassis over the front wheels. Between the bin and the tank and at one side of the chassis is a console 13, in which the electrical controls for the system are housed. The construction of the bin will be described first.

Figure 6:
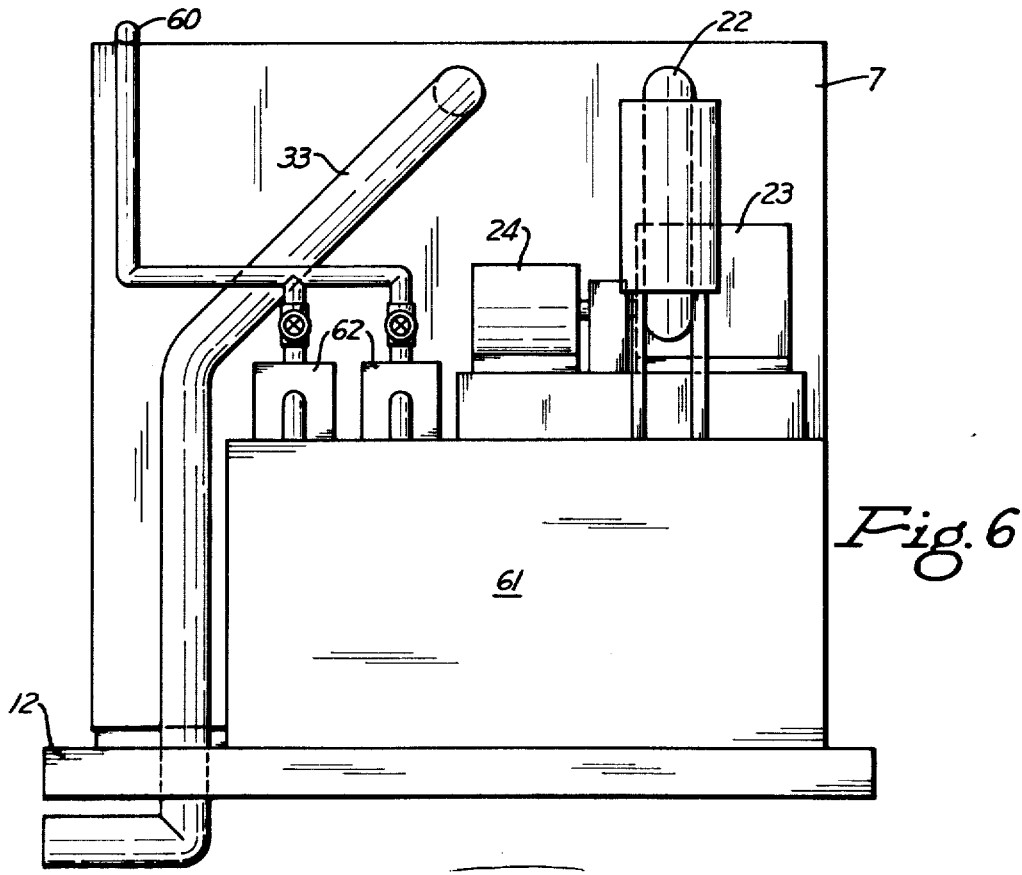
FIG. 6 is a view of the rear end of the unit.
Figure 5:
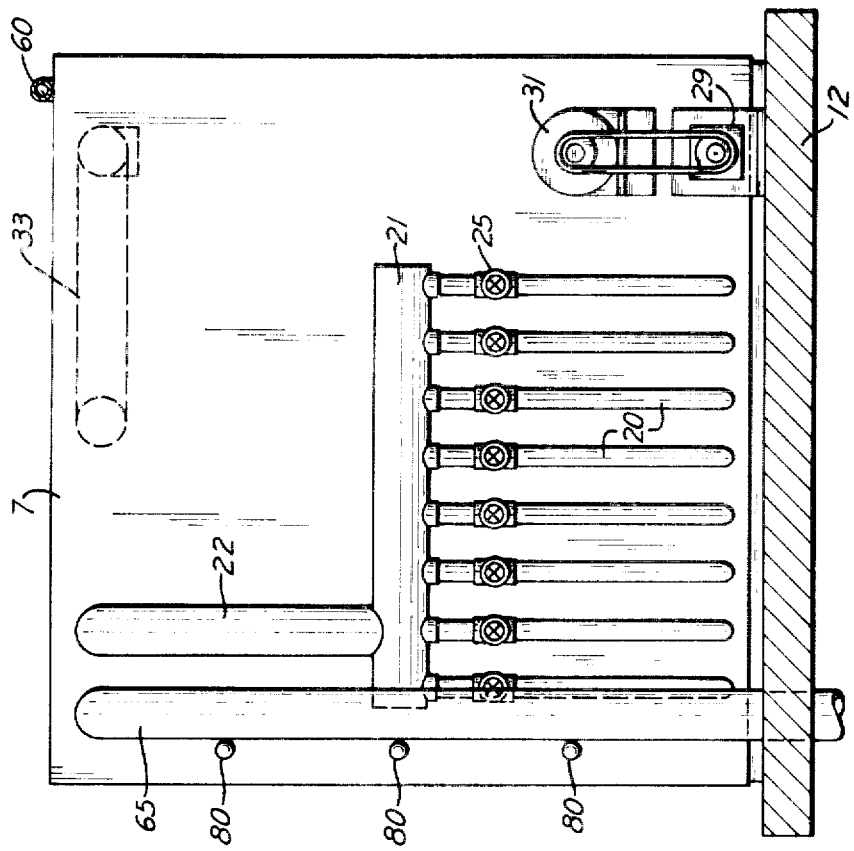
FIG. 5 is an enlarged end view taken on the line V—V of FIG. 3.

As shown in FIGS. 7 and 8, there are spaced partition members 15 extending lengthwise of the bottom of the bin and these are crossed midway between their ends by a transverse partition member 16. These members therefore separate the lower portion of the bin into a number of rectangular chambers. The tops of these chambers are covered by porous members 17, such as reinforced canvas, clamped at their edges to the side and end flanges of metal pans 18 that have air openings 19 in their bottoms. The pan flanges rest on members 15 and 16, so the porous members form the floor of the bin. Extending from the front end of the bin into each of the chambers beneath the pans is a pipe 20 for delivering air under pressure that will flow up through the pans and their porous covers and into the bin above, the purpose being to create a fluidized bed of the powdered setting agent. The front or outer ends of these pipes extend upwardly, as shown in FIGS. 3 and 5, to a horizontal manifold 21 mounted on the front wall of the tank. Compressed air is delivered to this manifold through a large pipe 22 that extends upwardly and then back entirely through the bin and then down to an air compressor 23 driven by an electric motor 24 as shown in FIGS. 2 and 6. Each of the pipes 20 extending down out of the manifold is provided with a valve 25 so that the air pressure to the different chambers can be controlled individually. This permits different areas of the fluidized bed to be fluffed to eliminate dead spots so that the powder will keep moving toward the bin outlet.

The outlet from the bin for the setting agent powder is in a lower corner of the front wall of the bin as shown in FIGS. 2, 3 and 7. Extending through this opening is a screw conveyor 27 that turns in a trough 28 inside the bin and in a tube 29 outside of the bin. The front end of the tube has an opening in its bottom that is connected with an opening 30 (FIG. 9) in the bed of the chassis. The conveyor is driven from its front end by a chain and sprocket drive from an electric motor 31 supported above it. In order to cause the fluidized bed to flow toward the conveyor trough in the bin, the two porous members 17 behind the trough slope slightly from the rear end of the bin down toward the conveyor. Also, the rest of the porous members slope slightly from the opposite sides of the bin toward the forwardly sloping porous members just mentioned. Consequently, the fluidized bed flows from one side of the bin toward the other side and then forward to the conveyor and the bin outlet. The slope of the porous members shown in the drawings is only about 2°. The porous floor of the bin, therefore, can be seen to be nearly horizontal.

The bin is filled with powdered setting agent, such as Portland cement, through a pipe 33 shown in FIGS. 2, 3 and 6 that starts below the chassis bed and extends up through it to a point near the top of the back wall of the bin and then extends forward through the center of the bin to a point near its front wall and then slants over to a point above the conveyor. The outlet end of this pipe is directed downwardly over the conveyor. The bottom of the pipe is also provided with other outlets 34 along its length to distribute the incoming cement more evenly. The powder is blown into this pipe and through it into the bin. Since the compressed air for fluidizing the bin is turned off during the filling process, the powder that is blown down from the outlet end of the pipe directly into the conveyor will keep the conveyor fed so that the waste-treating operation does not have to be shut down while the bin is being refilled.

Figure 9:
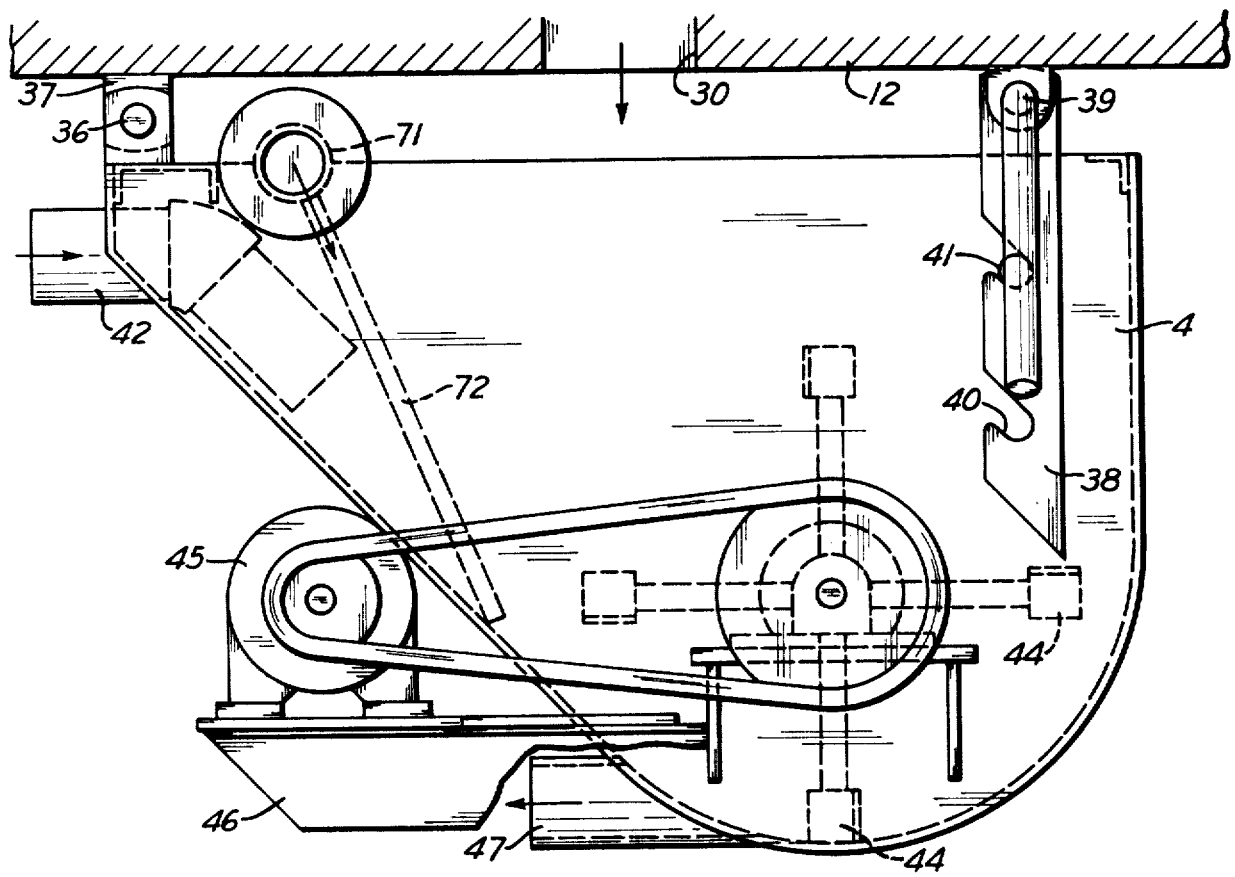
FIG. 9 is an end view of the mixing hopper.

When the setting agent powder leaves the screw conveyor it falls through the chassis opening 30 into mixing hopper 4 that is suspended below the chassis as shown in FIGS. 3 and 9. This hopper is hinged by a hinge pin 36 at one side to brackets 37 on the bottom of the chassis, and its opposite side normally is held in its upper position by latches 38 rigidly connected to a horizontal rod 39 pivoted to the bottom of the chassis. The latches are provided with slots 40 for receiving pins 41 on the ends of the hopper to support it. By swinging the latches outwardly away from the pins, the outer side of the hopper can be lowered part way during waste treatment so that the mixing in the hopper can be observed. The hose 3 from the pond is connected to an inlet pipe 42 in the upper part of the hopper. To mix the powder with liquid waste material in the hopper, the latter is provided with a longitudinally extending shaft 43, from which paddles 44 extend radially. The shaft is rotated from one end by a motor 45 supported on a bracket 46 secured to the outside of the hopper. The bottom of the hopper is provided with a pair of tubular outlet fittings 47. One of these is connected with hose 5 leading to the discharge pump 6. The pump generally will be a separate portable pump, but it could be permanently mounted on the vehicle chassis. The other outlet fitting can be plugged and used as a drain and as a standby outlet in case the other one becomes clogged. It also can be used for recirculating the contents of the mixing hopper.

Figure 4:
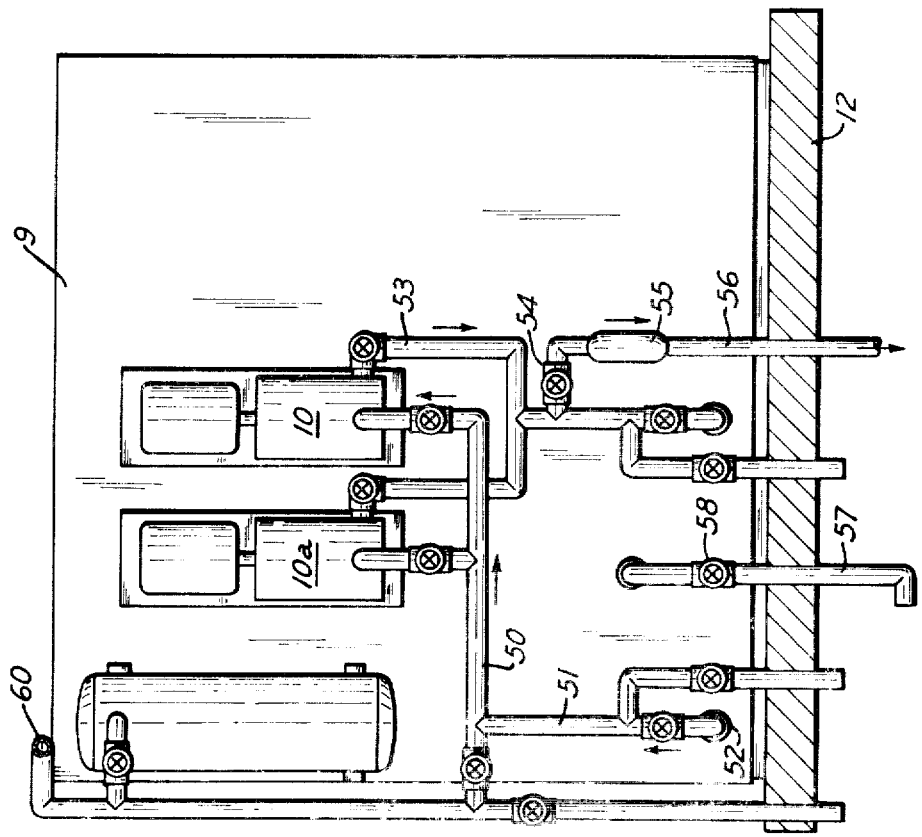
FIG. 4 is an enlarged end view taken on the line IV—IV of FIG. 3.

The sodium silicate pump 10 is mounted on the inner end of tank 9 as shown in FIG. 4. A back-up pump 10a may be mounted beside it for use in case pump 10 fails. The pump inlets are connected by pipes 50 and 51 with a tank outlet 52. The outlet of pump 10 is connected by a pipe 53 and a valve 54 with a flowmeter 55 in a pipe 56. The lower end of this last pipe is adapted to be connected with the inlet of dishcarge pump 6 in FIG. 1. As soon as the silicate mixes with the slurry discharged from the hopper the resulting chemical reaction causes chunks of solidified material to start forming, but the fluid velocity in line 5 is high enough to prevent formation of plugs in the line. Whatever small chunks may be produced will be broken up by the pump impeller, which also serves as a very efficient mixer. The tank can be filled with the liquid alkali metal silicate through a filler pipe 57, in which there is a normally closed valve 58. The rest of the pipes shown in FIG. 4 are for flushing out the system with water that is delivered through an overhead pipe 60 from a water tank 61 mounted on the chassis behind the setting agent bin 7. A pair of water pumps 62 are mounted on the tank as shown in FIGS. 2, 3 and 6.

Figure 10:
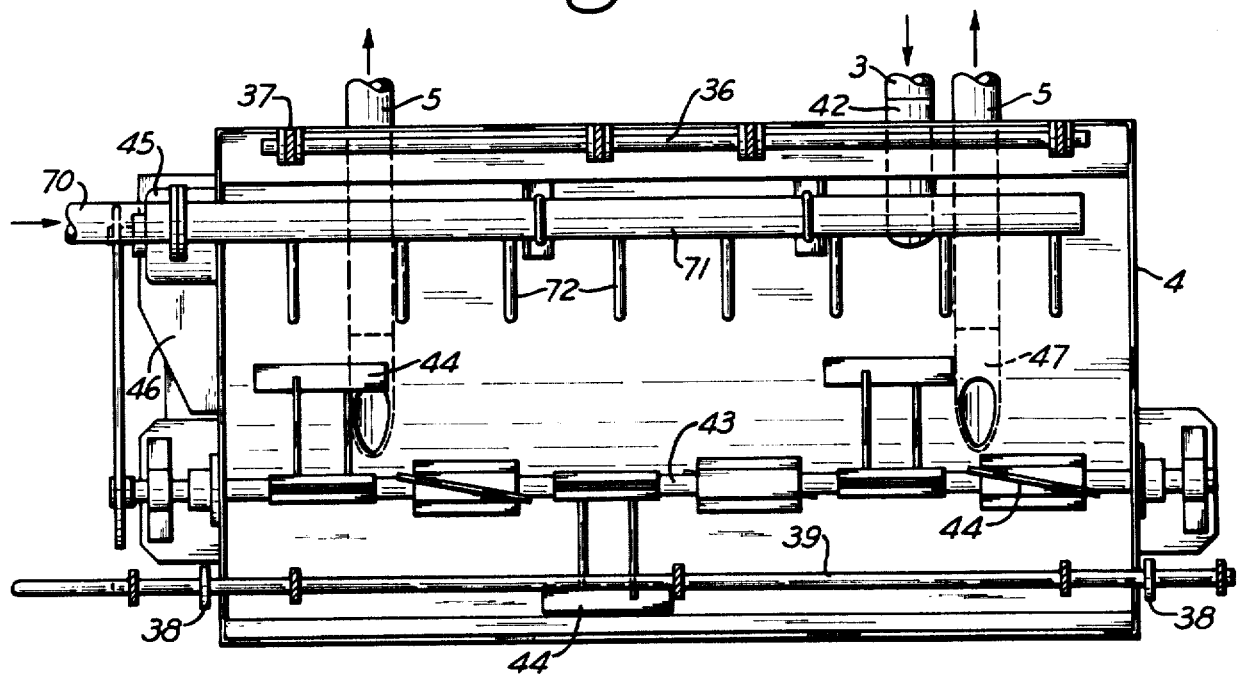
FIG. 10 is a plan view of the hopper.
Figure 11:
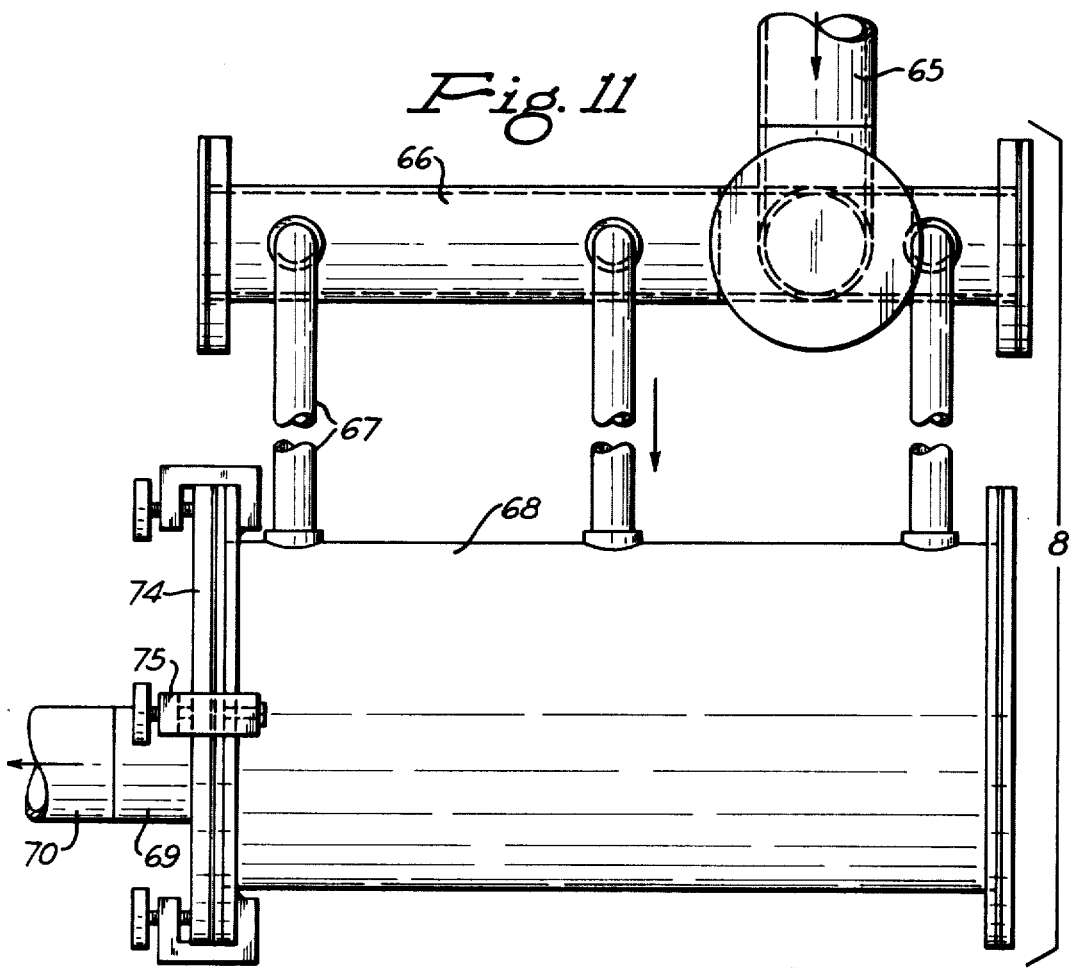
FIG. 11 is a side view of the dust collector assembly.
Figure 12:
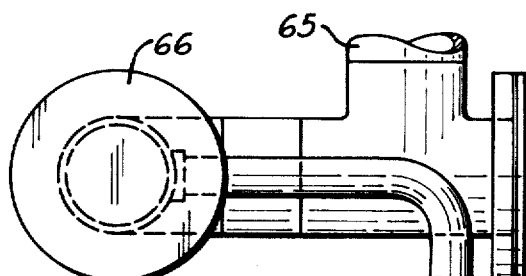
FIG. 12 is an end view thereof.
Figure 13:
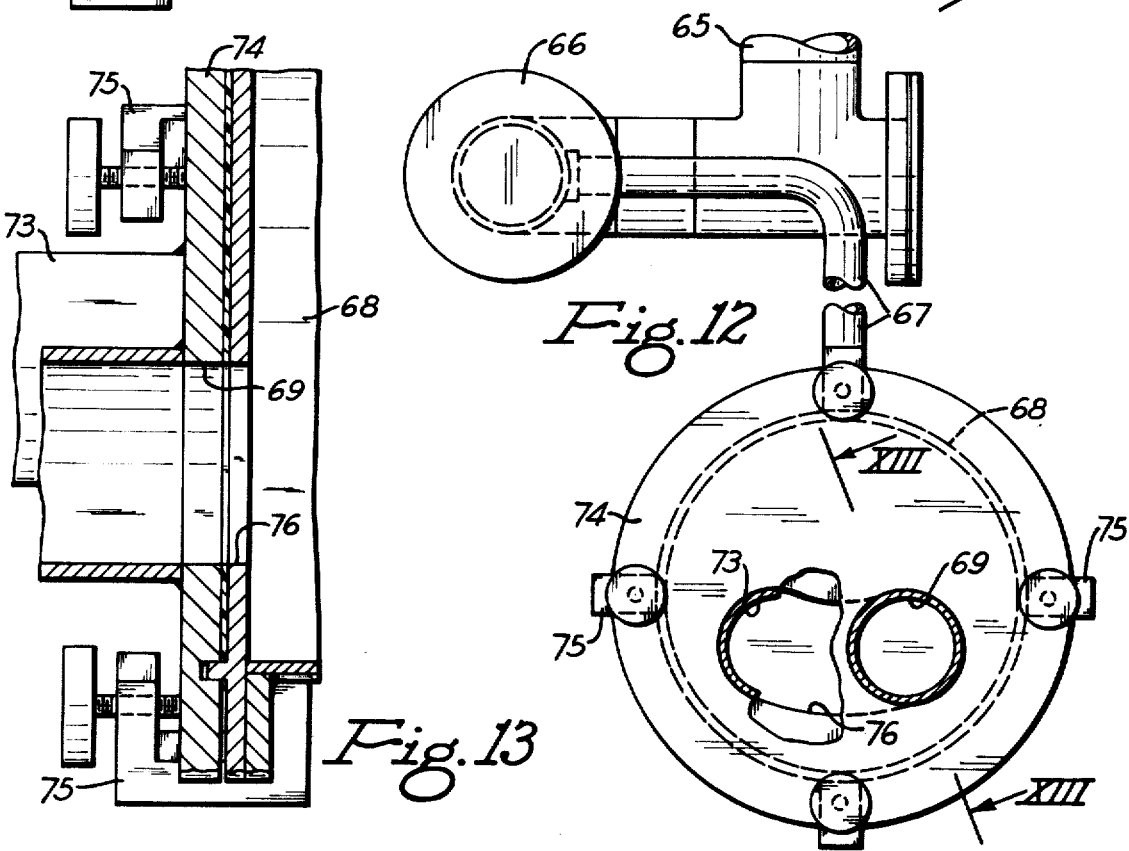
FIG. 13 is an enlarged fragmentary section taken on the line XIII—XIII of FIG. 12.

Since the fluidized bed in the bin is created by compressed air, the incoming air must also escape from the bin. An outlet for this purpose is provided near the top of the front wall of the bin. In view of the fact that some powder and dust will escape with this air, it is necessary to prevent it from being blown out into the atmosphere. Therefore, the outlet is connected to a pipe 65 that extends downwardly through the bed of the van to dust collector 8. The dust collector is composed of a manifold and a dust box. The manifold 66 is supported beneath the bed as shown in FIGS. 2, 11 and 12, and is provided with outlet pipes 67 that connect it to the top of the dust box 68 likewise suspended from the chassis of the vehicle. One end of the dust box is provided with an outlet 69 connected by a flexible conduit 70 to one end of a manifold pipe 71 supported by the upper ends of the end walls of the mixing hopper 4 as shown in FIGS. 9 and 10. This pipe is provided with outlet pipes 72 extending down into the hopper so that dust-laden air will be fed into the mixture in the hopper. The same end of the dust box also has another outlet 73, to which can be connected a hose that is immersed in a barrel of water (not shown) resting on the ground. If too much dust is being delivered to the hopper by the dust collector, it can be reduced be feeding more into the barrel where it will be trapped by the water. For this purpose the two outlets from the dust box are in a rotatable round plate 74 normally clamped against the end wall of the box by clamps 75. In one position of the plate, both outlet openings communicate fully with an arcuate slot 76 in the adjoining end wall. At that time dust-laden air from the box will flow through both outlets about equally. By loosening the clamps and turning the plate in one direction or the other, the inner end of either outlet opening can be partly or completely covered by the end wall, so flow through one outlet will be reduced or stopped and flow through the other outlet will be increased.

A further feature of the invention is the provision of a plurality of conventional level sensors 80 mounted on the front end wall of bin 7 at different levels and projecting into the bin. These sensors indicate the height of the fluidized bed of powdered setting agent in the bin by means of lights or a meter at the console so that as the bed level falls an attendant can close valves 25 by degrees to throttle down the fluidizing air being delivered to the bin beneath its porous floor. This is important because, otherwise, too much powder would be blown out through pipe 65 as the volume of setting agent in the bin decreased.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A mobile unit for treating liquid waste to render it non-polluting and fit for ultimate disposal, comprising a truck trailer chassis provided with wheels for transportation over the ground, a mixing hopper supported by said chassis and provided with an inlet and an outlet, said inlet being adapted to be connected with means for delivering liquid waste to the hopper from a source of supply, said outlet being adapted to be connected to conduit means extending from the hopper to a disposal area, a substantially rectangular bin for a powdered silicate setting agent mounted on said chassis and having an outlet at its bottom, upright partition walls in said bin mounted on its bottom to form a plurality of chambers, substantially flat porous members covering said chambers to form a porous floor in the bin spaced above its bottom and sloping toward said bin outlet, a source of compressed air, pipe means connecting said source with each of said chambers for delivering compressed air to the space in the bin beneath its porous floor to form a fluidized bed of setting agent above said floor, valves in said pipe means for controlling flow of air therethrough to the different chambers independently of one another, said pipe means and said valves being constructed and arranged to control the bulk density of the setting agent in said bin and prevent dead-spots therein, means for delivering setting agent from said bin outlet to said hopper, means in the hopper for mixing setting agent with liquid waste therein, a tank for liquid alkali metal silicate mounted on said chassis and having an outlet, and a conduit connected to said tank outlet for delivering silicate to the hopper mixture.

2. A mobile unit according to claim 1, in which said partition walls are parallel.

3. A mobile unit according to claim 1, in which said partition walls extend lengthwise of said chassis and are parallel, and said pipe means are connected to one end of said chambers.

4. A mobile unit according to claim 3, in which there are two rows of said chambers extending across the bin.

5. A mobile unit according to claim 1, in which said mixing hopper is suspended beneath said chassis, the chassis has a vertical opening therethrough above the hopper, said bin outlet is in a vertical end wall of the bin, and said agent-delivering means include a screw conveyor extending through said bin outlet from inside the bin to a position above said chassis opening.

6. A mobile unit according to claim 5, in which said bin outlet is in a lower corner of said end wall, said porous floor has a narrow portion sloping lengthwise of the bin downwardly toward said bin outlet and located adjacent the side wall of the bin that is beside its outlet, and the rest of the porous floor slopes transversely of the bin from the opposite side of the bin downwardly to the side of said narrow portion.

7. A mobile unit according to claim 1, in which said bin has an upper outlet for air, the mobile unit including means connected with said upper outlet for delivering dust-laden air from the bin to the lower part of said hopper for mixing with said liquid waste and the setting agent.

8. A mobile unit according to claim 7, in which said dust-delivering means include a manifold adjacent said hopper for receiving dust-laden air from the bin, the manifold being provided with a plurality of outlets, and pipes extending from the manifold outlets down into said hopper.

9. A mobile unit according to claim 8, in which said dust-delivering means also include a dust box having an inlet for dust-laden air from the bin and having a pair of outlets, means connecting one of said box outlets to the inlet of said manifold, the other outlet of said box being adapted to be connected to a dust collector, and means for reducing the flow of dust-laden air from either of said box outlets.

* * * * *